United States Patent
Prakash et al.

(10) Patent No.: US 11,734,286 B2
(45) Date of Patent: Aug. 22, 2023

(54) AUTOMATIC DATABASE INSIGHT ANALYSIS

(71) Applicant: ThoughtSpot, Inc., Palo Alto, CA (US)

(72) Inventors: Amit Prakash, Saratoga, CA (US); Antony Chuxiao Chen, Bellevue, WA (US); Gunjan Jha, Redmond, WA (US); Jasmeet Singh Jaggi, Union City, CA (US); Manoj Krishna Ghosh, Kirkland, WA (US); Pavan Ram Piratla, Campbell, CA (US); Pradeep Dorairaj, Bellevue, WA (US); Sanjay Agrawal, Sammamish, WA (US)

(73) Assignee: ThoughtSpot, Inc., Mountain View, CA (US)

( * ) Notice: Subject to any disclaimer, the term of this patent is extended or adjusted under 35 U.S.C. 154(b) by 935 days.

(21) Appl. No.: 16/156,414

(22) Filed: Oct. 10, 2018

(65) Prior Publication Data

US 2019/0108230 A1    Apr. 11, 2019

Related U.S. Application Data

(60) Provisional application No. 62/570,577, filed on Oct. 10, 2017.

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/221* (2019.01); *G06F 16/248* (2019.01)

(58) Field of Classification Search
CPC . G06F 16/24578; G06F 16/221; G06F 16/248
(Continued)

(56) References Cited

U.S. PATENT DOCUMENTS

| 8,577,913 B1 | 11/2013 | Hansson et al. |
| 9,275,132 B2 | 3/2016 | Roberts et al. |

(Continued)

FOREIGN PATENT DOCUMENTS

| EP | 268367 A2 | 5/1988 |
| EP | 1587011 A1 | 10/2005 |

(Continued)

OTHER PUBLICATIONS

Sayyadian et al., "Efficient Keyword Search Across Heterogeneous Relational Databases", 2007, IEEE, 346-355 (10 pp).

(Continued)

*Primary Examiner* — Vincent F Boccio
(74) *Attorney, Agent, or Firm* — Young Basile Hanlon & MacFarlane, P.C.

(57) ABSTRACT

Automatic database analysis includes identifying a current context for accessing data from a low-latency database and generating an exploration query based on the current context, which includes identifying a column from the low-latency database as a column of utility in response to determining that a probabilistic utility for the column satisfies a defined utility criterion. The current context includes a requested result set satisfying a requested search criterion, and the probabilistic utility is based on the current context. The analysis includes generating an exploration result set based on the exploration query, generating insights based on the exploration result set, ranking the insights, and outputting at least one insight based on the ranking.

20 Claims, 8 Drawing Sheets

(51) Int. Cl.
G06F 16/22 (2019.01)
G06F 16/248 (2019.01)

(58) Field of Classification Search
USPC .......................................................... 707/734
See application file for complete search history.

(56) References Cited

U.S. PATENT DOCUMENTS

| | | | |
|---|---|---|---|
| 9,405,794 | B2 | 8/2016 | Prakash et al. |
| 10,248,720 | B1* | 4/2019 | Wesley .................. G06F 16/34 |
| 2004/0267730 | A1 | 12/2004 | Dumais et al. |
| 2005/0027717 | A1 | 2/2005 | Koudas et al. |
| 2005/0289124 | A1 | 12/2005 | Kaiser et al. |
| 2006/0122976 | A1 | 6/2006 | Baluja et al. |
| 2007/0192300 | A1 | 8/2007 | Reuther et al. |
| 2007/0219974 | A1 | 9/2007 | Chickering et al. |
| 2008/0109422 | A1 | 5/2008 | Dedhia |
| 2009/0019019 | A1 | 1/2009 | Jones et al. |
| 2009/0019022 | A1 | 1/2009 | Schallert et al. |
| 2011/0113048 | A1 | 5/2011 | Njemanze |
| 2012/0066217 | A1 | 3/2012 | Eder |
| 2012/0162265 | A1 | 6/2012 | Heinrich et al. |
| 2013/0339370 | A1 | 12/2013 | Holstege et al. |
| 2014/0156639 | A1* | 6/2014 | Shridhar ............. G06F 16/2462 707/722 |
| 2014/0201241 | A1 | 7/2014 | Wood et al. |
| 2014/0337371 | A1 | 11/2014 | Li |
| 2015/0026153 | A1* | 1/2015 | Gupta .................. G06F 16/951 707/711 |
| 2016/0371317 | A1 | 12/2016 | Sharma et al. |
| 2017/0270159 | A1 | 9/2017 | Wang et al. |
| 2019/0095510 | A1* | 3/2019 | Cruise .................... G06Q 10/10 |

FOREIGN PATENT DOCUMENTS

| | | |
|---|---|---|
| EP | 2202658 A2 | 6/2010 |
| EP | 2207106 A2 | 7/2010 |
| WO | 0141002 A1 | 6/2001 |
| WO | 2015009353 A1 | 1/2015 |

OTHER PUBLICATIONS

Wu et al: "Towards Keyword-Driven Analytical Processing", Proceedings of the 2007 ACM Sigmod International Conference on Management of Data, Sigmo '07, Jun. 12, 2007, (12 pp).
Anonymous: "File System Permission—Wikipedia, The Free Encyclopedia." Jun. 11, 2013 (Jun. 11, 2013); URL: http://en.wikipedia.org/w/index/php?title.sub.-File.sub.-system.sub.-p- ermissions &oldid=559455322 [retrieved on May 11, 2014]; (8 pp).
Shi et al.: "50x Faster: Speeding Up An SQL-Based Legacy System With Few Changes", Oct. 4, 2011 Retrieved from Internet: URL: http://www.user.tu-berline.de/komm/CD/paper/040221.pdf [retrieved on Jun. 11, 2014]. (12 pp).
Li et al: "Efficient Type-Ahead Search on Relational Data: a TASTIER Approach", Sigmod-Pods '09: Compilation Proceedings of the International Conference on Management Data & 28th Symposium on Principles of Database Systems; Providence, RI,USA, Association for Computing Machines, New York NY Jun. 29, 2009, pp. 695-706 (12 pp).
Blunschi et al: "SODA: Generating SQL for Business Users", Proceedings of the VLDB Endowment, vol. 5, No. 10, Aug. 27, 2012 pp. 932-935 (12 pp).
Baid et al: "Toward Scalable Keyword Search over Relational Data", Proceedings of the VLDS Endowment, vol. 3, No. 1-2, Sep. 1, 2010, pp. 140-149 (10 pp).
Jajodia et al., "Flexible Support for Multiple Access Control Policies", ACM Transactions on Database Systems, ACM New York, NY, USA, vol. 26, No. 2, Jun. 1, 2001, pp. 217-228 (48 pp).
Anonymous, "Natural Language Processing", Wikipedia, Downloaded Jan. 30, 2019, https://en.wikipedia.org/wiki/Natural_language_processing, (8 pp).
Seif, G., "An Easy Introduction to Natural Language Processing—Using Computers to Understand Human Language", Oct. 1, 2018 (Downloaded Jan. 30, 2019), https://towardsdatascience.com/an-easy-introduction-to-natural-language-processing-b1e2801291c1, (11 pp).
Extended European Search Report received in co-pending Application No. EP 19160657.3 dated Apr. 4, 2019 (11 pp).
International Search Report and Written Opinion for PCT/US14/39230; dated Nov. 24, 2014 (16 pp).
Avrach, A., thoughtspot.com, "What the Bleep is a Chasm Trap?", https://www.thoughtspot.com/fact-and-dimension/what-bleep-chasm-trap 9/, Date Unknown, Downloaded Apr. 2, 2019 (9 pp).
Sisense, "Chasm and Fan Traps", https://documentation.sisense.com/latest/managing-data/working-with-data/chasm-fan-traps.htm, Date Unknown, Downloaded Apr. 2, 2019 (8 pp).
Thoughtspot, "Chasm Traps", https://docs.thoughtspot.com/4.4/admin/loading/chasm-trap.html, Version 4.4 Guides, Date Unknown, Downloaded Apr. 2, 2019 (4 pp).
Morton, K., et al., "Dynamic Workload Driven Data Integration In Tableau", Proceedings of the 2012 International Conference on Management of Data, SIGMOD '12, Jan. 1, 2012, p. 807 (9 pp).
Extended European Search Report dated Jul. 26, 2019, issued in co-pending EP Application No. 19166422.6 (11 pp).
Wikipedia, "Consistent hashing", https://en.wikipedia.org/wiki/Consistent_hashing, Date Unknown, Downloaded Aug. 15, 2019, (5 pp).
Eades, Peter, et al., "A Fast & Effective Heuristic for the Feedback Arc Set Problem," Information Processing Letters, vol. 47, Issue 6, Oct. 18, 1993, pp. 319-323.
Wikipedia, "Dijkstra's algorithm", Date Unknown, downloaded Jul. 16, 2019, https://en.wikipedia.org/wiki/Dijkstra%27s_algorithm (11 pp).
Towards keyword-driven analytical processing; Wu, Ping et al; IBM Almaden Research Center, San Jose, CA USA, Conference Paper—Jan. 2007.
Extended European Search Reported issued in co-pending European Application No. 19208974.6 dated Mar. 30, 2020 (9 pp).

* cited by examiner

AUTOMATIC DATABASE INSIGHT ANALYSIS

CROSS-REFERENCE TO RELATED APPLICATION

This application claims priority to and the benefit of U.S. Provisional Application Patent Ser. No. 62/570,577, filed Oct. 10, 2017, the entire disclosure of which is hereby incorporated by reference.

BACKGROUND

Advances in computer storage and database technology have led to exponential growth of the amount of data being created. Businesses are overwhelmed by the volume of the data stored in their computer systems. Current database analysis methods and systems are not able to timely identify useful information stored within such large amounts of data. Existing database analytic tools are inefficient, costly to utilize, and/or require substantial configuration and training.

SUMMARY

Disclosed herein are implementations of methods and system for automatically analyzing data in a database. The method may include receiving a current context of the database. A current context may be the results of a query, an entire table, a worksheet, or a subset of the foregoing. The subset may include one or more data values or columns selected by a user. The current context may include information about the user, information about the data space, information about the initial search (i.e., search terms, tokens, and/or the search query), and the results from the initial search. For clarity, this result set may be referred to as the requested result set.

The method for analyzing data in a database may include identifying a current context for accessing data from a low-latency database. The current context may include a requested result set. The requested result set may satisfy a requested search criterion. The method may include generating an exploration query based on the current context. Generating the exploration query may include identifying a column from the low-latency database as a column of utility in response to a determination that a probabilistic utility for the column satisfies a defined utility criterion. The probabilistic utility for the column may be based on the current context. The method may include generating an exploration result set based on the exploration query. The method may include generating a plurality of insights based on the exploration result set. The method may include ranking the plurality of insights. The method may include outputting at least one insight from the plurality of insights based on the ranking.

A system for generating an insight may include an insight unit. The insight unit may be configured to identify a current context for accessing data from a database. The database may be a low-latency database. The current context may include a requested result set satisfying a requested search criterion. The insight unit may be configured to generate an exploration query based on the current context. The insight unit may generate the exploration query by identifying a column from the database as a column of utility in response to a determination that a probabilistic utility for the column satisfies a defined utility criterion. The probabilistic utility for the column may be based on the current context. The insight unit may be configured to generate an exploration result set based on the exploration query. The insight unit may be configured to generate a plurality of insights based on the exploration result set. The insight unit may be configured to rank the plurality of insights. The insight unit may be configured to output at least one insight from the plurality of insights based on the ranking.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
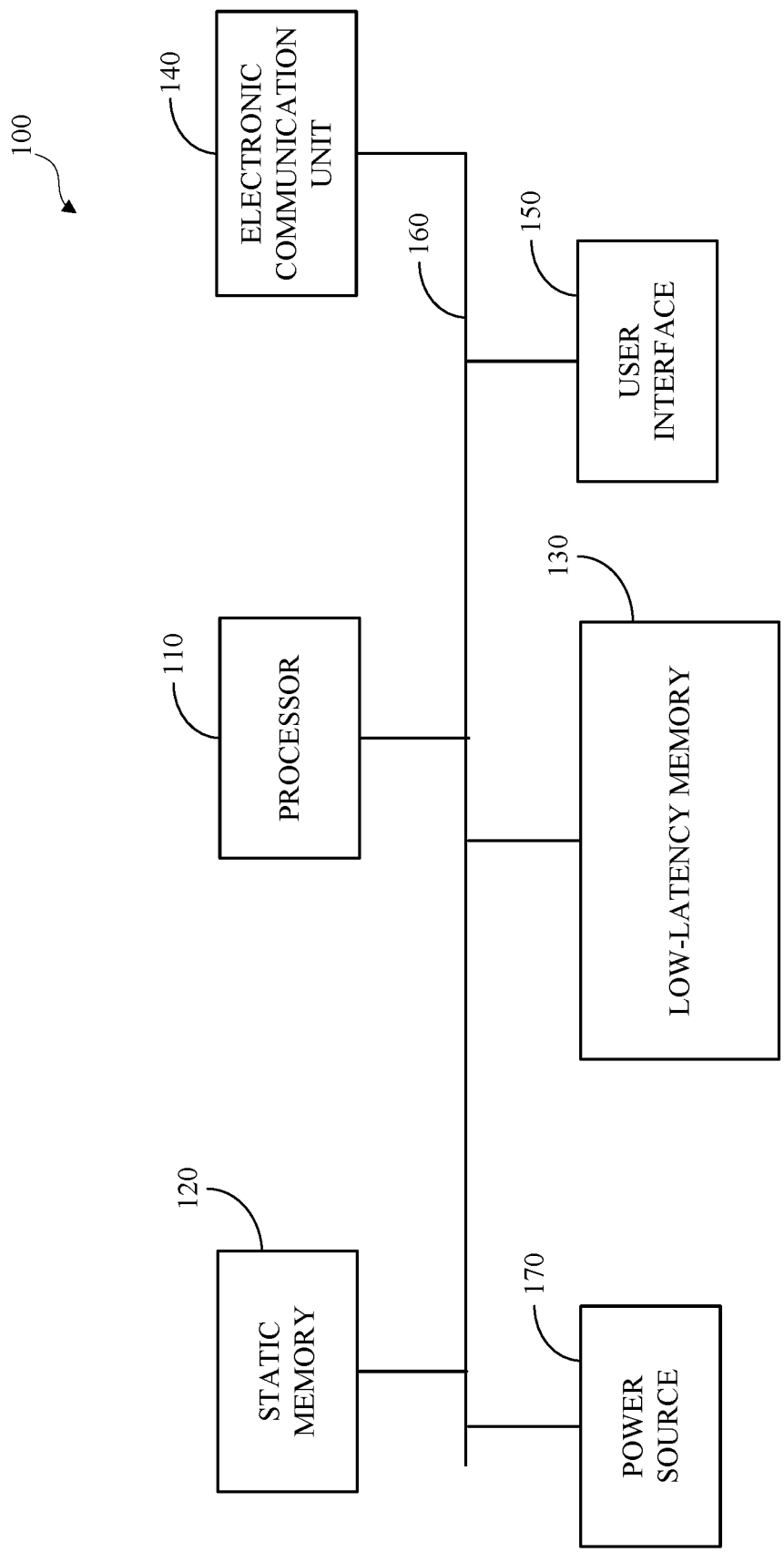
FIG. 1 is a block diagram of an example of a computing device in accordance with this disclosure.

Business and other organizations store large amounts of data, such as business records, transaction records, and the like, in data storage systems, such as relational database systems that store data as records, or rows, having values, or fields, corresponding to respective columns in tables that can be interrelated using key values. Databases structures are often normalized or otherwise organized to maximize data density at the expense of increased complexity and reduced accessibility. Individual records and tables may have little or no utility without substantial correlation, interpretation, and analysis. The complexity of these data structures and the large volumes of data that can be stored therein limit the accessibility of the data and require substantial skilled human resources to code procedures and tools that allow business users to access useful data. The tools that are available for accessing these systems are limited to outputting data expressly requested by the users and lack the capability to identify and prioritize data other than the data expressly requested. Useful data, such as data aggregations, patterns, and statistical anomalies that would not be available in smaller data sets (e.g., 10,000 rows of data), and may not be apparent to human users, may be derivable using the large volume of data (e.g., millions or billions of rows) stored in complex data storage systems, such as relational database systems, but may be inaccessible due to the complexity and limitations of the data storage systems.

The systems and methods for automatic database analysis disclosed herein improve the efficiency and accessibility of database storage systems by automatically identifying and prioritizing data based on probabilistic utility, to create or surface useful data and information about data, such as trends, patterns, and anomalies, that otherwise would be inaccessible or unknown. Data may also be organized contextually based on structures or relationships within the data that may be otherwise imperceptible.

For example, the systems and methods herein can be provided with a current context to begin an automatic analysis process. A current context can be the results of a query, an entire table, or a worksheet. A current context can also be a subset of the foregoing. The subset can include one or more data values or columns selected by a user. The current context may include information about the user, information about the data space, information about the initial search (i.e., search terms, tokens, and/or the search query), and the results from the initial search. For clarity, this result set may be referred to as the requested result set.

The input data of the current context can be analyzed, e.g., for outliers, correlations, and/or trendlines. Where the input data of the current context includes two data values, the analysis can include comparing the data values and analyzing the comparison (e.g., difference between the data values). The current context can also be an output of the methods and systems described herein. For example, a current context can be used to produce a result set (e.g., insight) regarding the current context. That result set corresponding to the insight can then be used to perform additional analyses and generate additional insights. In an example, the result set corresponding to a generated insight may be used as a context to generate another insight. This process can iteratively be repeated. In response to generating and outputting a first insight, if the user elects to investigate the first insight, the current context would be the context used to generate the first insight and portion of the exploration result set corresponding to the selected insight. In this way, the analysis can surface nuanced insights that may not be directly apparent from the initial data set (e.g., not only an insight that provides information about the data itself, but also insights that provide information about the insights themselves).

Automatic database analysis may continuously improve the utility of data that is surfaced or created using experiential learning. Experiential learning can include tracking the quantity and types of past queries for columns, values, and/or tables in a database, user interface interactions, and user feedback and adjusting the data that is surface or created based on the tracked information. For purposes of this description, a unit of automatically identified data (also referred to as an insight) can include any single or set of columns (also referred to as measures or attributes), values, and/or tables that is not expressly requested by a user (and instead is surfaced or created by the systems or methods described herein).

FIG. 1 is a block diagram of an example of a computing device 100 in accordance with this disclosure. One or more aspects, features, or elements of automatic database analysis may be implemented using the computing device 100. The computing device 100 includes a processor 110, static memory 120, low-latency memory 130, an electronic communication unit 140, a user interface 150, a bus 160, and a power source 170. Although shown as a single unit, any one or more element of the computing device 100 may be integrated into any number of separate physical units. For example, the low-latency memory 130 and the processor 110 may be integrated in a first physical unit and the user interface 150 may be integrated in a second physical unit. Although not shown in FIG. 1, the computing device 100 may include other units, or elements, such as an enclosure or one or more sensors.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 110 may include any device or combination of devices capable of manipulating or processing a signal or other information, including optical processors, quantum processors, molecular processors, or a combination thereof. The processor 110 may be a central processing unit (CPU), such as a microprocessor, and may include one or more processing units, which may respectively include one or more processing cores. The processor 110 may include multiple interconnected processors. For example, the multiple processors may be hardwired or networked, including wirelessly networked. In some implementations, the operations of the processor 110 may be distributed across multiple physical devices or units that may be coupled directly or across a network. In some implementations, the processor 110 may include a cache, or cache memory, for internal storage of operating data or instructions. The processor 110 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 110 may be operatively coupled with the static memory 120, the low-latency memory 130, the electronic communication unit 140, the user interface 150, the bus 160, the power source 170, or any combination thereof. The processor may execute, which may include controlling the static memory 120, the low-latency memory 130, the electronic communication unit 140, the user interface 150, the bus 160, the power source 170, or any combination thereof to execute, instructions, programs, code, applications, or the like, which may include executing one or more aspects of an operating system, and which may include executing one or more instructions to perform one or more aspects, features, or elements described herein, alone or in combination with one or more other processors.

The static memory 120 is coupled to the processor 110 via the bus 160 and may include non-volatile memory, such as a disk drive, or any form of non-volatile memory capable of persistent electronic information storage, such as in the absence of an active power supply. Although shown as a single block in FIG. 1, the static memory 120 may be implemented as multiple logical or physical units.

The static memory 120 may store executable instructions or data, such as application data, an operating system, or a combination thereof, for access by the processor 110. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 130 is coupled to the processor 110 via the bus 160 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 130 may be implemented as multiple logical or physical units.

The low-latency memory 130 may store executable instructions or data, such as application data for low-latency access by the processor 110. The executable instructions may include, for example, one or more application programs, that may be executed by the processor 110. The executable instructions may be organized into programmable modules or algorithms, functional programs, codes, code segments, and/or combinations thereof to perform various functions described herein. For example, the executable instructions may include instructions to identify a column of utility, generate an exploration query based on a search query, generate an insight based on a result of the exploration query, and transmit an insight for display on a user device. An exploration query may be based on an analysis of lower level data of a hierarchically structured data based on probabilistic utility. The lower level data may be referred to as a drill path. A drill path may be a type of exploration query for grouping by a column of utility. An exploration query may be automatically generated by identifying and prioritizing the lower level data based on probabilistic utility. Analyzing an exploration query may include refining attributes to identify utility data by identifying columns (i.e., groups of attributes) and further analyzing those columns by automatically identifying and prioritizing the data based on probabilistic utility to automatically generate a data set for each exploration query. The generated data set may be referred to as an exploration result set.

The low-latency memory 130 may be used to store data that is analyzed or processed using the systems or methods described herein. For example, storage of some or all data in low-latency memory 130 instead of static memory 120 may improve the execution speed of the systems and methods described herein by permitting access to data more quickly by an order of magnitude or greater (e.g., nanoseconds instead of microseconds).

The electronic communication unit 140 is coupled to the processor 110 via the bus 160. The electronic communication unit 140 may include one or more transceivers. The electronic communication unit 140 may, for example, provide a connection or link to a network via a network interface. The network interface may be a wired network interface, such as Ethernet, or a wireless network interface. For example, the computing device 100 may communicate with other devices via the electronic communication unit 140 and the network interface using one or more network protocols, such as Ethernet, Transmission Control Protocol/Internet Protocol (TCP/IP), power line communication (PLC), WiFi, infrared, ultra violet (UV), visible light, fiber optic, wire line, general packet radio service (GPRS), Global System for Mobile communications (GSM), code-division multiple access (CDMA), or other suitable protocols.

The user interface 150 may include any unit capable of interfacing with a human user, such as a virtual or physical keypad, a touchpad, a display, a touch display, a speaker, a microphone, a video camera, a sensor, a printer, or any combination thereof. The user interface 150 may include a display; a positional input device, such as a mouse, touchpad, touchscreen, or the like; a keyboard; or any other human and machine interface device. The user interface 150 may be coupled to the processor 110 via the bus 160. In some implementations, the user interface 150 can include a display, which can be a liquid crystal display (LCD), a cathode-ray tube (CRT), a light emitting diode (LED) display, an organic light emitting diode (OLED) display, an active matrix organic light emitting diode (AMOLED), or other suitable display. In some implementations, the user interface 150 may be part of another computing device (not shown).

The bus 160 is coupled to the static memory 120, the low-latency memory 130, the electronic communication unit 140, the user interface 150, and the power source 170. Although a single bus is shown in FIG. 1, the bus 160 may include multiple buses, which may be connected, such as via bridges, controllers, or adapters.

The power source 170 provides energy to operate the computing device 100. The power source 170 may be a general-purpose alternating-current (AC) electric power supply, or power supply interface, such as an interface to a household power source. In some implementations, the power source 170 may be a single use battery or a rechargeable battery to allow the computing device 100 to operate independently of an external power distribution system. For example, the power source 170 may include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100.

Figure 2:
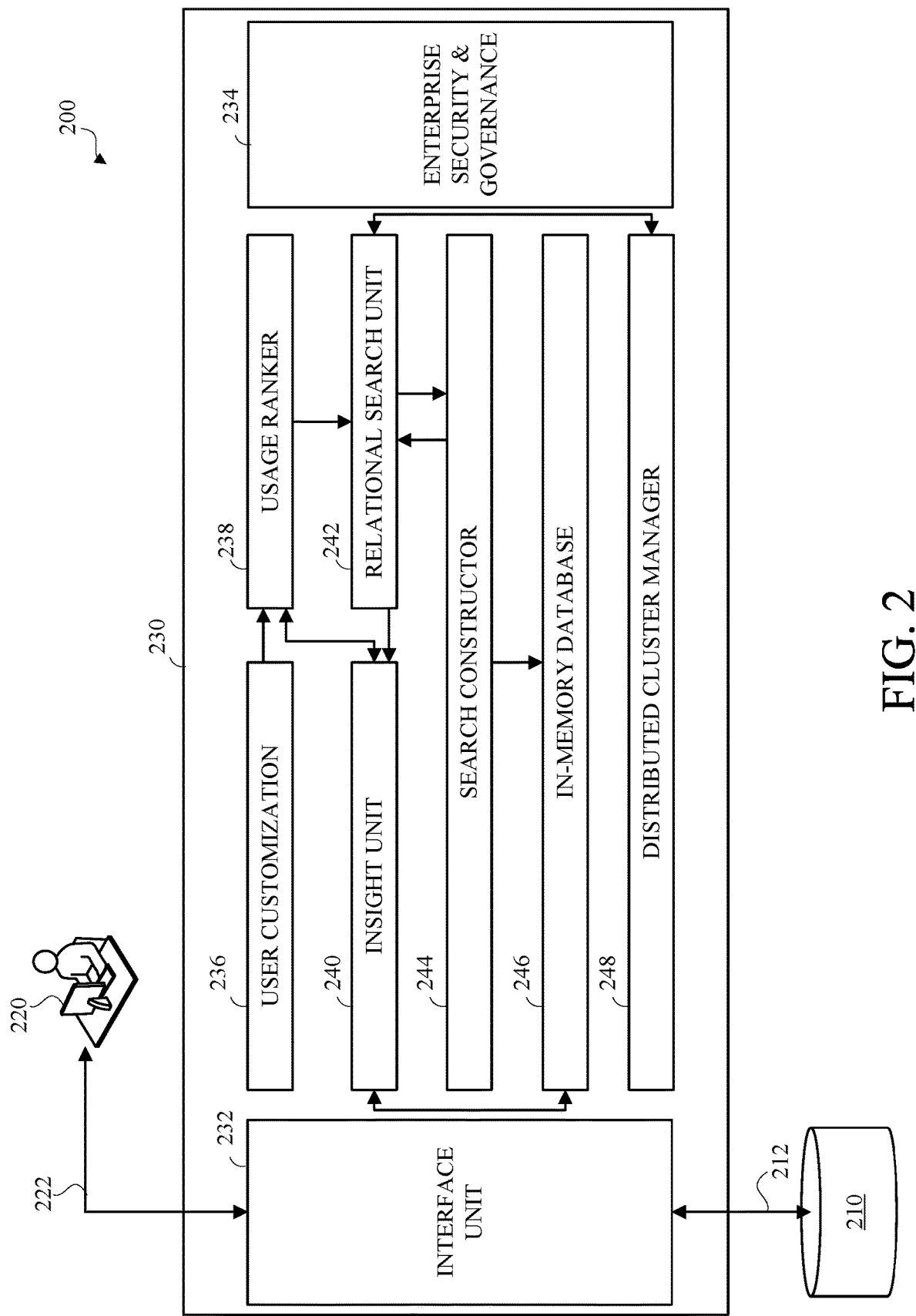
FIG. 2 is a block diagram of an example of an automatic database analysis system in accordance with this disclosure.

FIG. 2 is a block diagram of an example of an automatic database analysis system 200 in accordance with this disclosure. Automatic database analysis may be implemented using the automatic database analysis system 200. As shown, the automatic database analysis system 200 includes an external data source 210, a user device 220, and an automatic database analysis unit 230. For example, system 200 may be implemented in an enterprise computing environment, where external data source 210 is an existing database or databases in the enterprise computing environment and unit 230 is implemented in one or more servers or using one or more cloud computing providers.

The external data source 210 may be a structured database system, such as a relational database operating in a relational database management system (RDBMS), which may be an enterprise database. In some embodiments, the external data source 210 may be an unstructured data source. The external data source 210 may be implemented on a computing device, such as the computing device 100 shown in FIG. 1, which may be a server. In some embodiments, the external data source 210 may be stored on a static data storage device, such as a hard disk. Other external data sources may be used. Although one external data source 210 is shown for simplicity, multiple external data sources may be used.

The external data source 210 may communicate with the automatic database analysis unit 230 via an electronic communication medium 212, which may be a wired or wireless electronic communication medium. For example, the electronic communication medium 212 may include a local area network (LAN), a wide area network (WAN), a fiber channel network, the Internet, or a combination thereof. The external data source 210 may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source 210 may be referred to herein as enterprise data.

The user device 220 may be a computing device, such as the computing device 100 shown in FIG. 1. Although one user device 220 is shown for simplicity, multiple user devices may be used. A user may use the user device 220 to access the automatic database analysis unit 230. The user device 220 may comprise a personal computer, computer terminal, mobile device, smart phone, electronic notebook, or the like, or any combination thereof. The user device 220 may communicate with the automatic database analysis unit 230 via an electronic communication medium 222, which may be a wired or wireless electronic communication medium. For example, the electronic communication medium 222 may include a LAN, a WAN, a fiber channel network, the Internet, or a combination thereof.

The automatic database analysis unit 230 may be implemented on a computing device, such as by using one or more of the computing device 100 shown in FIG. 1. For example, the automatic database analysis unit 230 may be implemented using one or more server devices. In some embodiments, the automatic database analysis unit 230 may be implemented as one or more logical devices in a cloud-based configuration optimized for automatic database analysis. The automatic database analysis unit 230 may store and maintain low-latency data in a low-latency memory device, such as the low-latency memory 130 shown in FIG. 1, or any other type of data storage medium with relatively fast (low-latency) data access, organized in a low-latency data structure.

As shown in FIG. 2, the automatic database analysis unit 230 includes an automatic database analysis interface unit 232, an enterprise security and governance unit 234, a user customization unit 236, a usage ranker 238, an insight unit 240, a relational search unit 242, a search constructor 244, an in-memory database 246, and a distributed cluster manager 248. Although not expressly shown in FIG. 2, the automatic database analysis interface unit 232, the enterprise security and governance unit 234, the user customization unit 236, the usage ranker 238, the insight unit 240, the relational search unit 242, the search constructor 244, the in-memory database 246, and the distributed cluster manager 248 may communicate via an electronic communication medium, such as a computer bus or network. Although the automatic database analysis unit 230 is shown as a single unit, the automatic database analysis interface unit 232, the enterprise security and governance unit 234, the user customization unit 236, the usage ranker 238, the insight unit 240, the relational search unit 242, the search constructor 244, the in-memory database 246, and the distributed cluster manager 248 may be implemented in multiple operatively connected physical units. In some embodiments, one or more of the automatic database analysis interface unit 232, the enterprise security and governance unit 234, the user customization unit 236, the usage ranker 238, the insight unit 240, the relational search unit 242, the search constructor 244, the in-memory database 246, and the distributed cluster manager 248 may be implemented using multiple physical or logical units in a distributed configuration.

The automatic database analysis interface unit 232 may interface or communicate with one or more external devices or systems, such as the external data source 210, the user device 220, or both, via one or more electronic communication mediums, such as the electronic communication medium 212 or the electronic communication medium 222. The automatic database analysis interface unit 232 may implement an application programming interface (API), which may monitor, receive, or both, input signals or messages from the external devices and systems, process received signals or messages, transmit corresponding signals or messages to one or more of the enterprise security and governance unit 234, the user customization unit 236, the usage ranker 238, the insight unit 240, the relational search unit 242, the search constructor 244, the in-memory database 246, or the distributed cluster manager 248, receive output signals or messages from one or more of the enterprise security and governance unit 234, the user customization unit 236, the usage ranker 238, the insight unit 240, the relational search unit 242, the search constructor 244, the in-memory database 246, or the distributed cluster manager 248, and output, such as transmit or send, the output messages or signals to respective external devices or systems 210, 220. The automatic database analysis interface unit 232 may implement one or more data connectors, which may transfer data between, for example, the low-latency data structure and the external data source 210, which may include altering, formatting, evaluating, or manipulating the data.

The automatic database analysis interface unit 232 may receive, or otherwise access, enterprise data from the external data source 210 and may represent the enterprise data as low-latency data in the low-latency data structure (data population). The automatic database analysis interface unit 232 may represent the enterprise data from the external data source 210 as low-latency data in the low-latency data structure.

The data may be organized as tables and columns in the in-memory database 246 and may be accessed using a structured query language. The data may include values, such as quantifiable numeric values (such as integer or floating-point values), and non-quantifiable values (such as text or image data). Quantifiable data, such as numeric values indicating sizes, amounts, degrees, or the like, may be referred to herein as measures. Non-quantifiable data, such as text value indicating names and descriptions, may be referred to herein as attributes. The data may be organized in tables having rows and columns. A table may organize or group respective aspects of the data. For example, a 'Planets' table may include a list of planets. A table may include one or more columns. A column may describe the characteristics of a discrete aspect of the data in the table. For example, the 'Planets' table may include a 'Planet ID' column, which may describe a numeric value, and a 'Planet' column, which may describe a text value. A record or row of the table may include a respective value corresponding to each column of the table. A column defined as including quantifiable, or numeric, measures may be referred to herein as a measure column. A measure may be a property on which calculations (e.g., sum, count, average, minimum, maximum) may be made. A column defined as including non-quantifiable attributes may be referred to herein as an attribute column. An attribute may be a specification that defines a property of an object. For example, attributes may include text, identifiers, timestamps, or the like. The automatic database analysis interface unit 232 may consume and/or generate metadata that identifies one or more parameters or relationships for the data, such as based on the enterprise data, and may include the generated metadata in the low-latency data stored in the low-latency data structure. For example, the automatic database analysis interface unit 232 may identify characteristics of the data such as, attributes, measures, values, unique identifiers, tags, links, column and row keys, or the like, and may include metadata representing the identified characteristics in the low-latency data stored in the low-latency data structure. For example, characteristics of data can automatically be determined by consuming the schema in which the data is stored. Such an analysis can include automatically identifying links or relationships between columns, identifying the meaning of columns (e.g., using column names) and identifying commonly used terms in values (e.g., by indexing values and counting their occurrences).

Distinctly identifiable data in the low-latency data stored in the low-latency data structure may be referred to herein as a data portion. For example, the low-latency data stored in the low-latency data structure may be referred to herein as a data portion, a table from the low-latency data stored in the low-latency data structure may be referred to herein as a data portion, a column from the low-latency data stored in the low-latency data structure may be referred to herein as a data portion, a row or record from the low-latency data stored in the low-latency data structure may be referred to herein as a data portion, a value from the low-latency data stored in the low-latency data structure may be referred to herein as a data portion, a relationship defined in the low-latency data stored in the low-latency data structure may be referred to herein as a data portion, metadata describing the low-latency data stored in the low-latency data structure may be referred to herein as a data portion, or any other distinctly identifiable data, or combination thereof, from the low-latency data stored in the low-latency data structure may be referred to herein as a data portion.

The automatic database analysis interface unit 232 may automatically generate one or more tokens based on the low-latency data, or based on the enterprise data, such as in accordance with data population. A token may be a word, phrase, character, set of characters, symbol, combination of symbols, or the like. A token may represent a data portion in the low-latency data stored in the low-latency data structure. For example, the automatic database analysis interface unit 232 may automatically generate a token representing the attributes, the measures, the tables, the columns, the values, unique identifiers, tags, links, keys, or any other data portion, or combination of data portions, or a portion thereof. For example, automatic database analysis interface unit 232 may generate the token "planet" based on a column of data containing planet names and may generate respective tokens for the planet names in the column. The tokens may be included, such as stored, in the low-latency data stored in the low-latency data structure. The automatic database analysis interface unit 232 may classify the tokens, which may include storing token classification data in association with the tokens. For example, a token may be classified as an attribute token, a measure token, a value token, or the like.

The automatic database analysis interface unit 232 may generate a user interface, or one or more portions thereof, for the automatic database analysis system 200 (automatic database analysis interface user interface or user interface). For example, the automatic database analysis interface unit 232 may generate instructions for rendering, or otherwise presenting, the user interface, or one or more portions thereof and may transmit, or otherwise make available, the instructions for rendering, or otherwise presenting, the user interface, or one or more portions thereof to the user device 220, for presentation to a user of the user device 220. For example, the user device 220 may present the user interface via a web browser or a web application.

The automatic database analysis interface user interface may include an unstructured search string user input element or field. The user device 220 may display the unstructured search string user input element. The user device 220 may receive input, such as user input, corresponding to the unstructured search string user input element. The user device 220 may transmit, or otherwise make available, the unstructured search string user input to the automatic database analysis interface unit 232. The user interface may include other user interface elements and the user device 220 may transmit, or otherwise make available, other user input data to the automatic database analysis interface unit 232.

The automatic database analysis interface unit 232 may obtain the user input data, such as the unstructured search string, from the user device 220. The automatic database analysis interface unit 232 transmit, or otherwise make available, the user input data to the enterprise security and governance unit 234, the user customization unit 236, the usage ranker 238, the insight unit 240, the relational search unit 242, the search constructor 244, the in-memory database 246, the distributed cluster manager 248, or a combination thereof.

In some embodiments, automatic database analysis interface unit 232 may obtain the unstructured search string, or user input data, as a sequence of individual characters or symbols, and the automatic database analysis interface unit 232 may sequentially transmit, or otherwise make available, each character or symbol of the user input data to the enterprise security and governance unit 234, the user customization unit 236, the usage ranker 238, the insight unit 240, the relational search unit 242, the search constructor 244, the in-memory database 246, the distributed cluster manager 248, or a combination thereof.

In some embodiments, automatic database analysis interface unit 232 may obtain the unstructured search string, or user input data, as a sequence of individual characters or symbols, the automatic database analysis interface unit 232 may aggregate the sequence of individual characters or symbols, and may sequentially transmit, or otherwise make available, a current aggregation of the received user input data to the enterprise security and governance unit 234, the user customization unit 236, the usage ranker 238, the insight unit 240, the relational search unit 242, the search constructor 244, the in-memory database 246, the distributed cluster manager 248, or a combination thereof, in response to receiving each respective character or symbol from the sequence.

The enterprise security and governance unit 234 controls the output to the user from queries based on access rights held by the user. For example, a user may not have access to particular columns or data values in the data. The enterprise security and governance unit 234 can operate to prevent the return or visualization of insights or result sets to the user that the user does not have permission to view. The enterprise security and governance unit 234 may apply security at a metadata level through access to columns, tables, or at a data level through row level security. Insights may be based on what the user is authorized to see.

The user customization unit 236 may receive, process, and maintain user-specific utility data, such as user defined configuration data, user defined preference data, or a combination thereof. The user-specific utility data may indicate whether a data portion, such as a column, a record, an insight, or any other data portion, has high utility or low utility to an identified user. For example, the user-specific utility data may indicate that a defined column is a high-utility column or a low-utility column. The user customization unit 236 may store the user-specific utility data, such as using the low-latency data structure. The user customization unit 236 may store the feedback at an individual level and may include the context in which feedback was received from the user. Feedback may be stored in a disk based system. In some implementations, feedback may be stored in an in-memory storage.)

The usage ranker 238 may receive, process, and maintain user-agnostic utility data, such as system configuration data. The user-agnostic utility data may indicate whether a data portion, such as a column, a record, an insight, or any other data portion, has high utility or low utility to within the system, such across all users of the system. For example, the user-agnostic utility data may indicate that a defined column is a high-utility column or a low-utility column. The user usage ranker 238 may store the user-agnostic utility data, such as using the low-latency data structure. For example, in response to a user using, or accessing, a data portion, usage ranker 238 may store user-agnostic utility data indicating the usage, or access, event for the data portion, which may include incrementing a usage event counter associated with the data portion. In some embodiments, the usage ranker 238 may receive the information indicating the usage, or access, event for the data portion from the insight unit 240, and the usage, or access, event for the data portion may indicate that the usage is associated with an insight. In an example, the usage ranker 238 may send user-agnostic utility data to the insight unit 240.

The insight unit 240 may automatically identify one or more insights, which may be data other than data expressly requested by a user, and which may be identified and prioritized, or both, based on probabilistic utility. The insight unit 240 is described in relations to FIGS. 3-8.

The relational search unit 242 may index the tokens, for example using an inverted index data structure. Indexing the tokens may include generating or maintaining index data structures corresponding to the tokens that are optimized for data retrieval operations. For example, a global index may be maintained across columns to index all of the tokens in the database.

The relational search unit 242 may implement one or more finite state machines. A finite state machines may model or represent a defined set of states and a defined set of transitions between the states. A state may represent a condition of the system represented by the finite state machine at a defined temporal point. A finite state machine may transition from a state (current state) to a subsequent state in response to input. A transition may define one or more actions or operations that the relational search unit 242 may implement.

For example, a finite state machine may represent a current set of received user input data. The relational search unit 242 may generate or instantiate the received user input finite state machine. Instantiating the received user input finite state machine may include entering an empty state, indicating the absence of received user input. The relational search unit 242 may initiate or execute an operation, such as an entry operation, corresponding to the empty state in response to entering the empty state. Subsequently, the relational search unit 242 may receive user input data, and the received user input finite state machine may transition from the empty state to a state corresponding to the received user input data. In some embodiments, the relational search unit 242 may initiate one or more queries in response to transitioning to or from a respective state of a finite state machine.

The relational search unit 242 may instantiate, or generate, one or more search objects. The relational search unit 242 may initiates a search query by sending a search object to the search constructor 244. The relational search unit 242 may instantiate, generate, or modify one or more search objects in response to finite state machine transitions. For example, the relational search unit 242 may instantiate a search object in response to a first transition of a finite state machine. The relational search unit 242 may include a first search object instruction in the search object in response to a second transition of the finite state machine. The relational search unit 242 may send the search object including the first search object instruction to the search constructor 244 in response to the second transition of the finite state machine. The relational search unit 242 may include a second search object instruction in the search object in response to a third transition of the finite state machine. The relational search unit 242 may send the search object including the search object instruction, or a combination of the first search object instruction and the second search object instruction, to the search constructor 244 in response to the third transition of the finite state machine. The search object instructions may be represented using any annotation, instruction, text, message, list, pseudo-code, comment, or the like, or any combination thereof that may be converted, transcoded, or translated into structured search instructions for retrieving data from the low-latency data. Translation from a search object instruction to a structured search may be executed against an in-memory database. For example, an unstructured search may be translated to a structured search.

The search constructor 244 may generate, execute, or both, one or more structured search instructions. In some embodiments, the search constructor 244 may generate the structured search instructions using a defined structured data access language, which may be similar to Structured Query Language (SQL), except as described herein or otherwise clear from context. Executing the structured search instructions may include transmitting the structured search instructions to the in-memory database 246. The search constructor 244 may otherwise control the in-memory database 246, such as to maintain or modify the low-latency data structure, which may include, for example, joining columns or tables in the low-latency data structure, or aggregating, such as summing, one or more data portions, such as measures, in the low-latency data. The search constructor 244 may receive data responsive to executed structured search instructions, such as from the in-memory database 246. For simplicity and clarity, a discrete set of structured search instructions may be referred to herein as a query. The search constructor 244 may obtain, or otherwise access, results data, such as from the in-memory database 246, indicating the data resulting from executing the query on the low-latency data.

Although not shown separately in FIG. 2, the search constructor 244 may include a data visualization unit. In some embodiments, the data visualization unit may be a distinct unit, separate from the search constructor 24. In some embodiments, the interface unit 232 may include a user interface unit, and the data visualization unit may be included in the user interface unit.

The data visualization unit, the interface unit 232, or a combination thereof, may generate a user interface, or one or more portions thereof. For example, data visualization unit, the interface unit 232, or a combination thereof, may obtain the results data indicating the data resulting from executing the query on the low-latency data and may generate user interface elements representing the results data.

The in-memory database 246 may receive structured search instructions (queries), such as from the search constructor 244, and may access, manipulate, retrieve, or any combination thereof, the low-latency data from the low-latency data structure in accordance with, or in response to, the structured search instructions, which may include executing the structured search instructions.

Although shown as a single unit in FIG. 2, the in-memory database 246 may be implemented in a distributed configuration. For example, the in-memory database 246 may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The in-memory database 246 may identify an in-memory database instance as a query coordinator. The query coordinator may generate a query plan based on the received structured search instructions. The query plan may include query execution instructions for executing the received query by the one or more of the in-memory database instances. The query coordinator may distribute, or otherwise make available, the respective portions of the query execution instructions to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The in-memory database 246 may output, or otherwise make available, the results data to the search constructor 244.

The distributed cluster manager 248 manages the operative configuration of the automatic database analysis system 200, including the configuration and distribution of one or more of the automatic database analysis interface unit 232, the enterprise security and governance unit 234, the user customization unit 236, the usage ranker 238, the insight unit 240, the relational search unit 242, the search constructor 244, and the in-memory database 246 in a distributed configuration. For example, the distributed cluster manager 248 may instantiate one or more of the automatic database analysis interface unit 232, the enterprise security and governance unit 234, the user customization unit 236, the usage ranker 238, the insight unit 240, the relational search unit 242, the search constructor 244, or the in-memory database 246 on one or more physical devices or may allocate one or more resources, such as processors, to one or more of the automatic database analysis interface unit 232, the enterprise security and governance unit 234, the user customization unit 236, the usage ranker 238, the insight unit 240, the relational search unit 242, the search constructor 244, or the in-memory database 246.

The distributed cluster manager 248 may generate and maintain automatic database analysis system configuration data, such as in one or more tables, identifying the operative configuration of the automatic database analysis system 200. For example, the distributed cluster manager 248 may automatically update the automatic database analysis system configuration data in response to an operative configuration event, such as a change in availability or performance for a physical or logical unit of the automatic database analysis system 200. One or more of the automatic database analysis interface unit 232, the enterprise security and governance unit 234, the user customization unit 236, the usage ranker 238, the insight unit 240, the relational search unit 242, the search constructor 244, or the in-memory database 246 may access the automatic database analysis system configuration data, such as to identify intercommunication parameters or paths.

Figure 3:
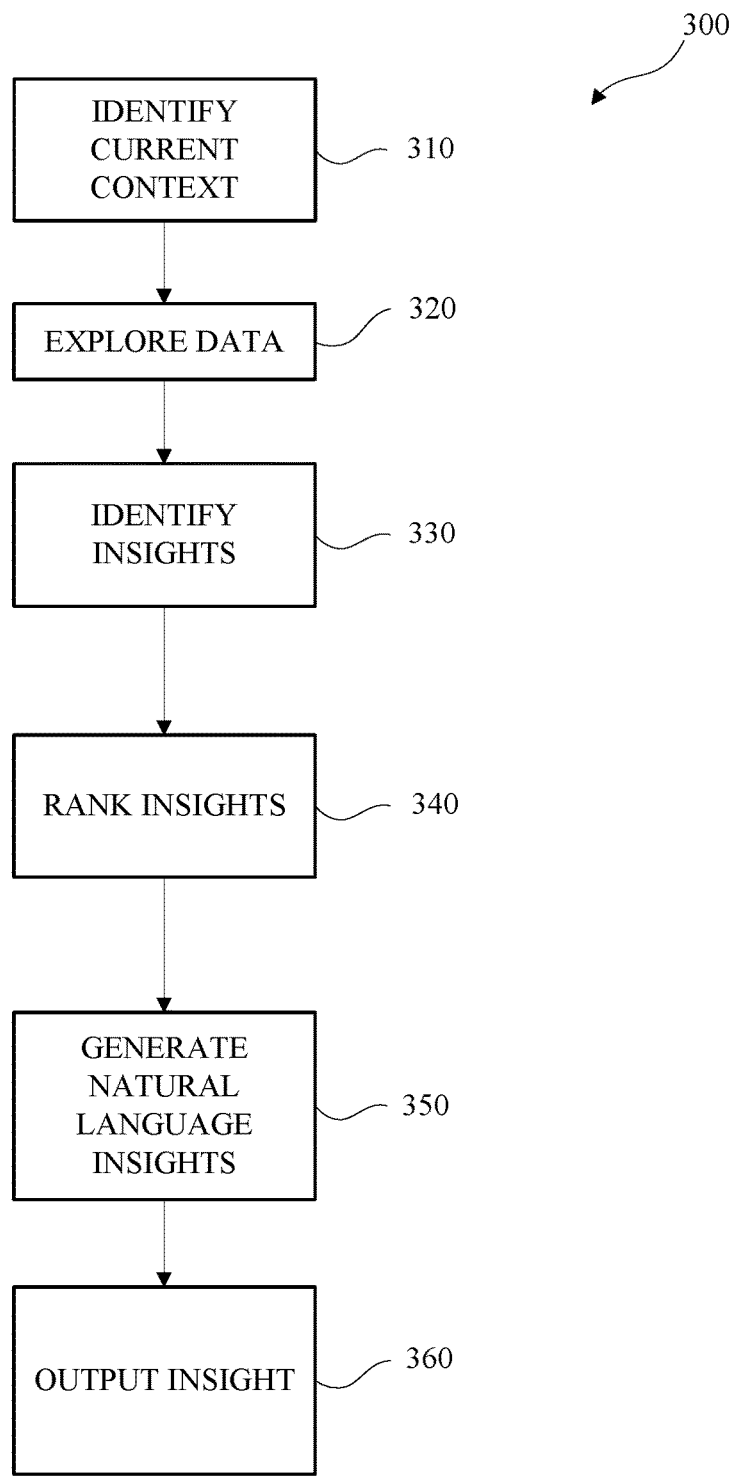
FIG. 3 is a flow diagram of an example of a method for automatic database analysis in accordance with this disclosure.

FIG. 3 is a flow diagram of an example of a method for automatic database analysis 300 in accordance with this disclosure. Automatic database analysis 300 may be implemented in a retrieval system such as the automatic database analysis system 200 shown in FIG. 2. As shown in FIG. 3, automatic database analysis 300 includes identifying a current context 310, exploring the data 320, identifying insights 330, ranking insights 340, generating natural language insights 350, and outputting the insights 360 In some implementations, generating natural language insights 350 may be omitted.

Automatic database analysis 300 includes identifying a current context 310. A current context may be used to access data from a low-latency database. A current context may indicate a requested search criterion. Identifying a current context 310 may include receiving data via a relational search unit, such as, for example, relational search unit 242 shown in FIG. 2. The received data may include utility data generated based on a user input. For example, the data may include a search result, or the data may be two or more selected data points on a table or a worksheet. Receiving the data 310 may include receiving data that indicates that the user is accessing the retrieval system without having input any search criteria.

Identifying a current context 310 may include ranking the data. Ranking the data may include automatically identifying and prioritizing data based on probabilistic utility. For example, ranking the data may be based on user preferences using a static rank or a dynamic rank. The static rank may be predetermined and adjusted by a system administrator. The dynamic rank may be a usage based ranking (UBR) based on a frequency of attribute usage, where a higher frequency of attribute usage would indicate a high utility attribute. The UBR may be applied to one or more data characteristics to identify utility data that a user may be interested in to refine the analysis. The UBR may be used to identify one or more columns of utility, and the one or more columns of utility may be translated to an exploration query against the database by the search constructor 244 shown in FIG. 2. In an example, the utility data may include one or more records or rows, or an aggregated count of user input data, such as feedback data, indicating a positive (or favorable) or negative (or unfavorable) utility event associated with a corresponding data portion.

Automatic database analysis 300 includes exploring the data 320. For example, exploring the data 320 may include generating an exploration query based on the current context. Generating the exploration query may include identifying a column from the low-latency database as a column of utility. The column of utility may be identified in response to a determination that a probabilistic utility for the column satisfies a defined utility criterion. The probabilistic utility for the column may be based on the current context. In an example, exploring the data 320 may include automatically identifying and prioritizing data based on probabilistic utility to identify utility data by asking questions (i.e., generating search queries) that a user may be interested in to refine the analysis. For example, exploring the data 320 may include identifying and analyzing lower level data of hierarchically structured data based on probabilistic utility. The identified lower level data may be referred to as a drill path. A drill path may be a type of exploration query for grouping by a column of utility. An exploration query may be automatically generated by identifying and prioritizing the lower level data based on probabilistic utility. Analyzing an exploration query may include refining attributes to identify utility data by identifying columns (i.e., groups of attributes) and further analyzing those columns by automatically identifying and prioritizing the data based on probabilistic utility to automatically generate an exploration result set for each exploration query.

Automatic database analysis 300 includes identifying insights 330. Identifying the insights 330 may include generating the insights based on the exploration result set. The insights may be identified based on a utility event associated with a corresponding data portion. The resulting data set of each exploration query is analyzed using one or more algorithms to identify one or more insights 330. The insights may be identified and prioritized based on probabilistic utility. The algorithms are used to help the user uncover anomalies and outliers, or identify relationships between measures that the user is unaware of. The algorithms may be used to find upward or downward trends on noisy data. The algorithms may automatically update or self-tune based on a characteristic of the data or column, a user preference, user feedback, system usage, or a combination thereof. Example algorithms may include, and are not limited to, outlier detection, cross correlation, trend analysis, comparative analysis, or a combination thereof. Example algorithms to identify insights 330 are shown in FIG. 5, FIG. 6, FIG. 7, and FIG. 8. To identify an insight, the method may determine the algorithm to apply to a column based on a characteristic of the data or column, a user preference, user feedback, system usage, or a combination thereof. User feedback may include, for example, feedback data, indicating a positive (or favorable) or negative (or unfavorable) utility event associated with a corresponding data portion.

Automatic database analysis 300 includes ranking the insights 340, for example by a statistical significance of utility, as the insights are generated. The retrieval system may personalize each generated insight for each user based on their search history, user and group profiles, data characteristics, or a combination thereof. In an example where the retrieval system applies an outlier detection algorithm to identify an insight 330, the retrieval system assigns a higher rank as uniqueness of the outlier increases. For example, the retrieval system may assign an insight with an outlier that has a high standard of deviation relative to the other outliers a higher ranking than an insight with an outlier that has a low standard of deviation relative to the other outliers. In an example where the retrieval system applies a trend analysis algorithm to identify an insight 330, the retrieval system assigns a higher rank as the slope of the trendline increases. For example, the retrieval system may assign an insight with a steep slope a higher ranking than an insight with a shallow slope.

Automatic database analysis 300 may include generating a natural language insight 350 that identifies the utility of the data. A natural language description may generated based on the type of insight. For example, for an outlier type insight, generating a natural language insight 350 may include using statistics of how many outliers were found in the underlying data of the exploration query, whether outliers were high or low. In a cross correlation type insight example, generating a natural language insight 350 may include using the correlation value and lag identified by the underlying algorithm. In a trend analysis type insight example, generating a natural language insight 350 may include using the generated slope to indicate whether the value is trending up or down. In a comparative analysis type insight example, generating a natural language insight 350 may include using a number of values that contribute to the largest change between two selected data points, and whether there is a significant change in market share of such points. The natural language insight 360 may be generated using pre-defined templates based upon characteristics of the data that is presented. For example, where a count of a particular value is higher than expected, a template such as [outlier column name] has [outlier count] occurrences which is higher than the normal range of [normal count range].

Automatic database analysis 300 may include outputting the insight 360. The retrieval system may generate a visualization, a natural language narrative, or a combination thereof, for each automatically generated insight. The retrieval system may output the insight 360 by displaying, transmitting, or storing each automatically generated insight. Example visualizations may include, and are not limited to, chloropleths, cartograms, dot distribution maps, proportional symbol maps, contour/isopleth/isarithmic maps, daysymetric map, self-organizing map, timeline, time series, connected scatter plots, Gantt charts, steam graph/theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps.

Figure 4:
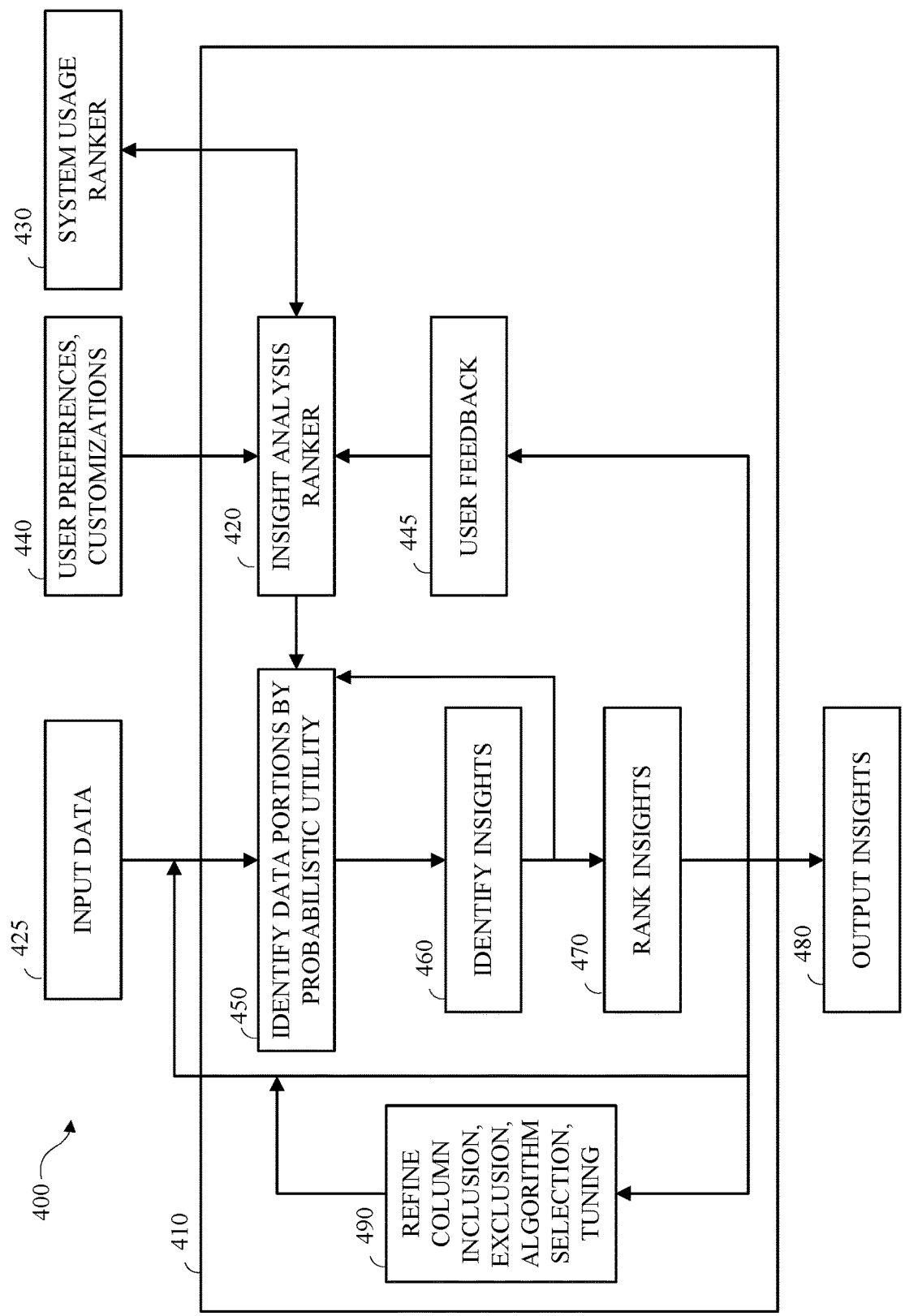
FIG. 4 is a flow diagram of another example of a method for automatic database analysis in accordance with this disclosure.

FIG. 4 is a flow diagram of another example of automatic database analysis 400. The automatic database analysis 400 may be performed by an insight unit 410 of a retrieval system, such as, for example, the automatic database analysis system 200 shown in FIG. 2. The insight unit 410 may include an insight analysis ranker 420.

Automatic database analysis 400 may be implemented by the insight unit 410. The insight unit 410 is configured to receive input data 425. The input data 425 may be received via a relational search unit, such as, for example, the relational search unit 242 shown in FIG. 2. The input data 425 may be received as a search result, or the input data may be two or more selected data points on a table or a worksheet. In an example where the input data 425 is a selection of two or more data points, the insight unit 410 may be configured to analyze the data points to explain the difference between the values of each data point. The input data 425 may be contextually based. For example, the input data 425 may include a list of available columns based on a user input determined by the relational search unit, and may be referred to as a current context.

The insight unit 410 is configured to receive data from the relational search unit, update search strategies with every search using the information from a system usage ranker 430, and generate an insight that is personalized and ranked in priority order for each user based on the patterns detected from their search history, user and group profiles, data characteristics, or any combination thereof. The insight analysis ranker 420 receives system usage information from the system usage ranker 430. The insight analysis ranker 420 may also receive user preferences and customizations 440, user feedback 445, or both. The information received from the system usage ranker 430 may include rank information based on a count of each search term that has been used. The user preferences and customizations 440 and may be predetermined prior to performing automatic database analysis. User feedback 445 may include feedback from a user, a group of users, or all users of the retrieval system, or a combination thereof. The feedback received from a user, a group of users, or all users of the retrieval system may be associated with on one or more insights generated by the retrieval system. User feedback may include, for example, feedback data, indicating a positive (or favorable) or negative (or unfavorable) utility event associated with a corresponding data portion. The insight analysis ranker 420 generates a column ranking based on the probabilistic utility of the information received. In an example, the generated column ranking may be sent to the system usage ranker 430 for use in determining a system usage rank.

Automatic database analysis 400 may include identifying data portions by probabilistic utility 450 based on the input data 425 and the column ranking information received from the insight analysis ranker 420. The determination of whether any attributes of a column, measures of a column, or both, may be of utility may be based on a characteristic of the data or column, a user preference, user feedback, system usage, or a combination thereof. Automatically determining whether one or more columns 450 may be of utility may include identifying algorithms of utility, parameters of utility, or both, to analyze the data. Once a column of utility is identified, an algorithm may be applied to determine if there are insights that correspond to the identified column of utility using an identified algorithm of utility. Algorithm parameters may be updated to generate insights by adjusting thresholds to identify insights.

Automatic database analysis 400 may include identifying one or more insights 460. For example, the insight unit 410 may be configured to analyze the one or more columns of utility using one or more algorithms to identify one or more insights 460. Automatic database analysis 400 may include exploring the one or more columns of utility to probabilistically identify utility data and automatically generate exploration queries based on the identified utility data to refine the analysis. The insight unit 410 analyzes the generated exploration queries to generate a resulting data set for each exploration query.

Automatic database analysis 400 includes analyzing the resulting data set of each exploration query, also referred to as an exploration result set, using one or more algorithms to identify one or more insights 460. In some examples, the exploration result set and the current context are analyzed using one or more algorithms to identify one or more insights 460. The algorithms are used to identify anomalies and outliers, or identify relationships between measures that the user may be unaware of. The algorithms may be used to find upward or downward trends on noisy data. The algorithms may automatically update or self-tune based on a characteristic of the data or column, a user preference, user feedback, system usage, or a combination thereof. Example algorithms may include, and are not limited to, outlier detection, cross correlation, trend analysis, comparative analysis, or a combination thereof. Example algorithms are shown in FIG. 5, FIG. 6, FIG. 7, and FIG. 8.

To identify an insight, the insight unit 410 may determine the algorithm to apply to a column based on a characteristic of the data or column, a user preference, user feedback, system usage, or a combination thereof. User feedback may include, for example, an indication of a positive (or favorable) or negative (or unfavorable) utility event associated with a corresponding data portion. In an example, the corresponding data portion may include stored experiential data such as utility data associated with an insight. The underlying data of the identified insights may be used to identify data portions by probabilistic utility 450.

Automatic database analysis 400 includes ranking the insights 470. Ranking the insights 470 may be based on a statistical significance of probabilistic utility. The insight unit 410 may personalize each insight for each user based on their search history, user and group profiles, data characteristics, or a combination thereof. In an example where the insight unit 410 applies an outlier detection algorithm to identify an insight 460, the insight unit 410 assigns a higher rank as uniqueness of the outlier increases. For example, the insight unit 410 may assign an insight with an outlier that has a high standard of deviation relative to the other outliers a higher ranking than an insight with an outlier that has a low standard of deviation relative to the other outliers. In an example where the insight unit 410 applies a trend analysis algorithm to identify an insight 560, the insight unit 410 assigns a higher rank as the slope of the trendline increases. For example, the insight unit 410 may assign an insight with a steep slope a higher ranking than an insight with a shallow slope.

Automatic database analysis 400 includes outputting the insights 480. For example, the insight unit 410 may send the top-ranking insights for display, transmission, or storage. For example, the top-ranking insights may be displayed on a user device, transmitted using either a push notification or a pull mechanism, stored in a memory, or a combination thereof. The insight unit 410 may automatically generate insight to include a visualization, a natural language narrative, or a combination thereof. Example visualizations may include, and are not limited to, chloropleths, cartograms, dot distribution maps, proportional symbol maps, contour/isopleth/isarithmic maps, daysymetric map, self-organizing map, timeline, time series, connected scatter plots, Gantt charts, steam graph/theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps.

Automatic database analysis 400 may include using the underlying data of the generated insights to refine column inclusion, column exclusion, algorithm selection, algorithm tuning, or any combination thereof 490. The underlying data of the generated insight may be used to automatically determine one or more columns 450 that may include utility data. The utility data may be associated with a user, a group of users, or all the users of the retrieval system. For example, a negative feedback on an insight lowers the utility value of the underlying column, or set of columns. A positive feedback or click on an insights (e.g., a view of an insight) increases the utility value of the underlying column or set of columns.

Figure 5:
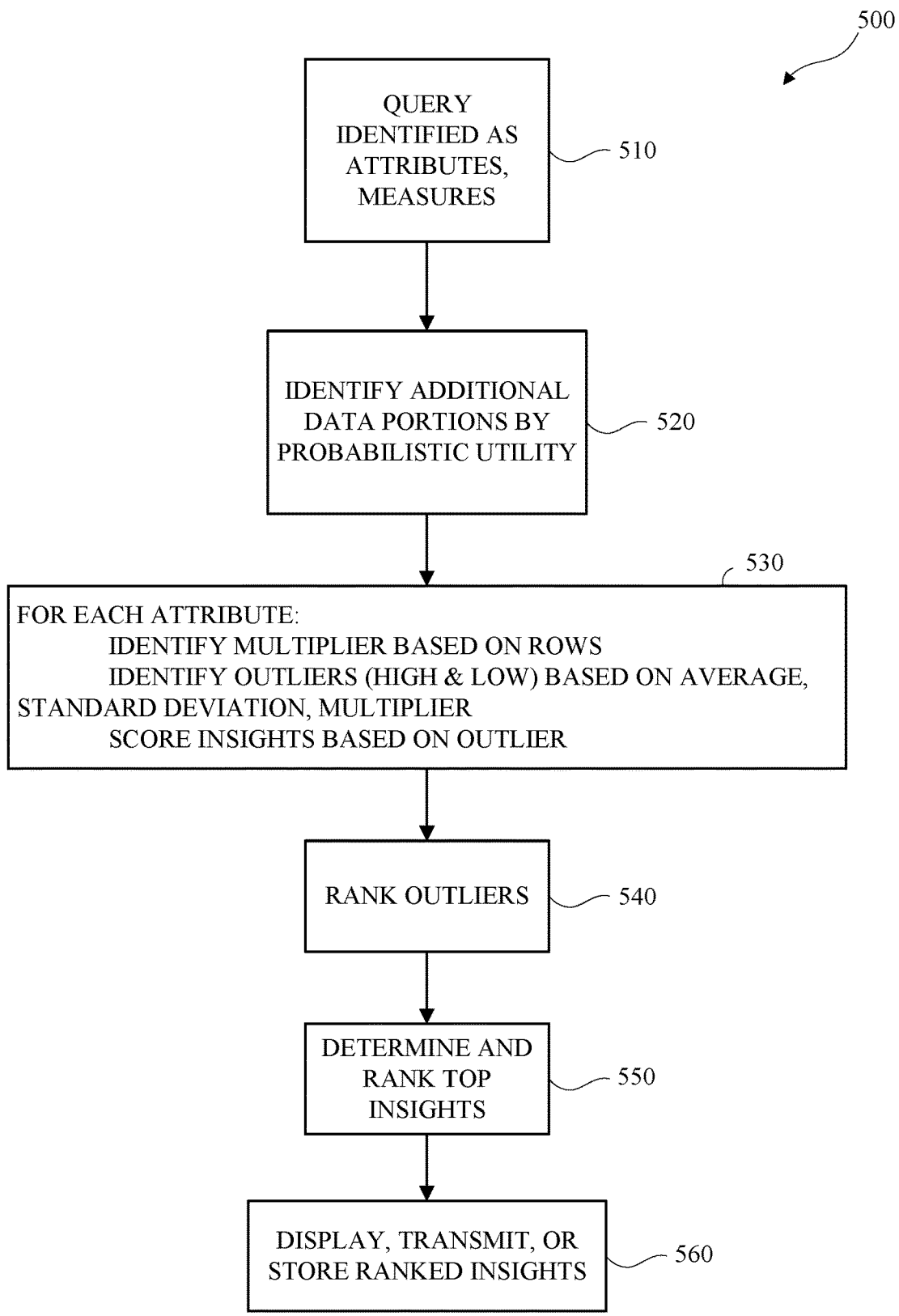
FIG. 5 is a flow diagram of an example of a method for outlier detection in accordance with this disclosure.

FIG. 5 is a flow diagram of an example of a method for outlier detection 500 that may be implemented by a retrieval system, such as, for example, the automatic database analysis system 200 shown in FIG. 2. Referring to FIG. 5, outlier detection 500 includes receiving a query and identifying the query as attributes and measures 510.

Outlier detection 500 includes identifying additional data portions by probabilistic utility 520. For example, identifying probabilistic utility may include identifying additional attributes of utility, measures of utility, and columns of utility, for example, date columns.

Outlier detection 500 includes analyzing attributes 530. Analyzing attributes 530 may include, for each attribute, identifying a multiplier, identifying one or more outliers, and scoring one or more insights. The multiplier identification may be considered when identifying outliers since a large multiplier would lead to identifying fewer outliers and vice versa. Outlier detection 500 automatically identifies a multiplier value to detect outliers, if any, in the underlying distribution. For example, an adaptive technique may be used to select the multiplier value where outlier detection 500 begins with a high multiplier value and incrementally reduces the multiplier value until outliers are identified. In some implementations, the automatic identification of the multiplier value may be overridden to provide user input of a multiplier value. Analyzing attributes 530 may include identifying a multiplier based on rows. The one or more outliers may be based on an average, a standard deviation, or a multiplier. Analyzing attributes 530 may include identifying high outliers, low outliers, or both for each attribute. Analyzing attributes 530 may include scoring the one or more insights based on an identified outlier. For each attribute, the insights may be scored based on a statistical significance of an outlier.

In an example, outlier detection 500 may include using a z-score based technique to identify an outlier. For example, outlier detection 500 may include determining the distance of a data point from an average of the underlying distribution to identify an outlier. A point may be classified as an outlier if it is outside a selected multiplier of standard deviation from the average.

In another example, outlier detection 500 may include using a linear regression technique to identify an outlier. For example, an ordinary least squares technique may be used to identify one or more outliers in the data distribution. A point may be classified as an outlier if its distance is too large from an expected distance, for example, when predicting using the linear model.

Outlier detection 500 may include ranking the identified outliers 540. For example, an outlier rank may be determined such that the more unique the outlier is, the higher the assigned rank. Each insight may be associated with a respective outlier score. Each insight may be determined and ranked based on its respective outlier score 550. The top ranking insights may be sent for display, transmission, or storage 560. For example, the top ranking insights may be displayed on a user device, transmitted using either a push or pull mechanism, stored in a memory, or a combination thereof.

Figure 6:
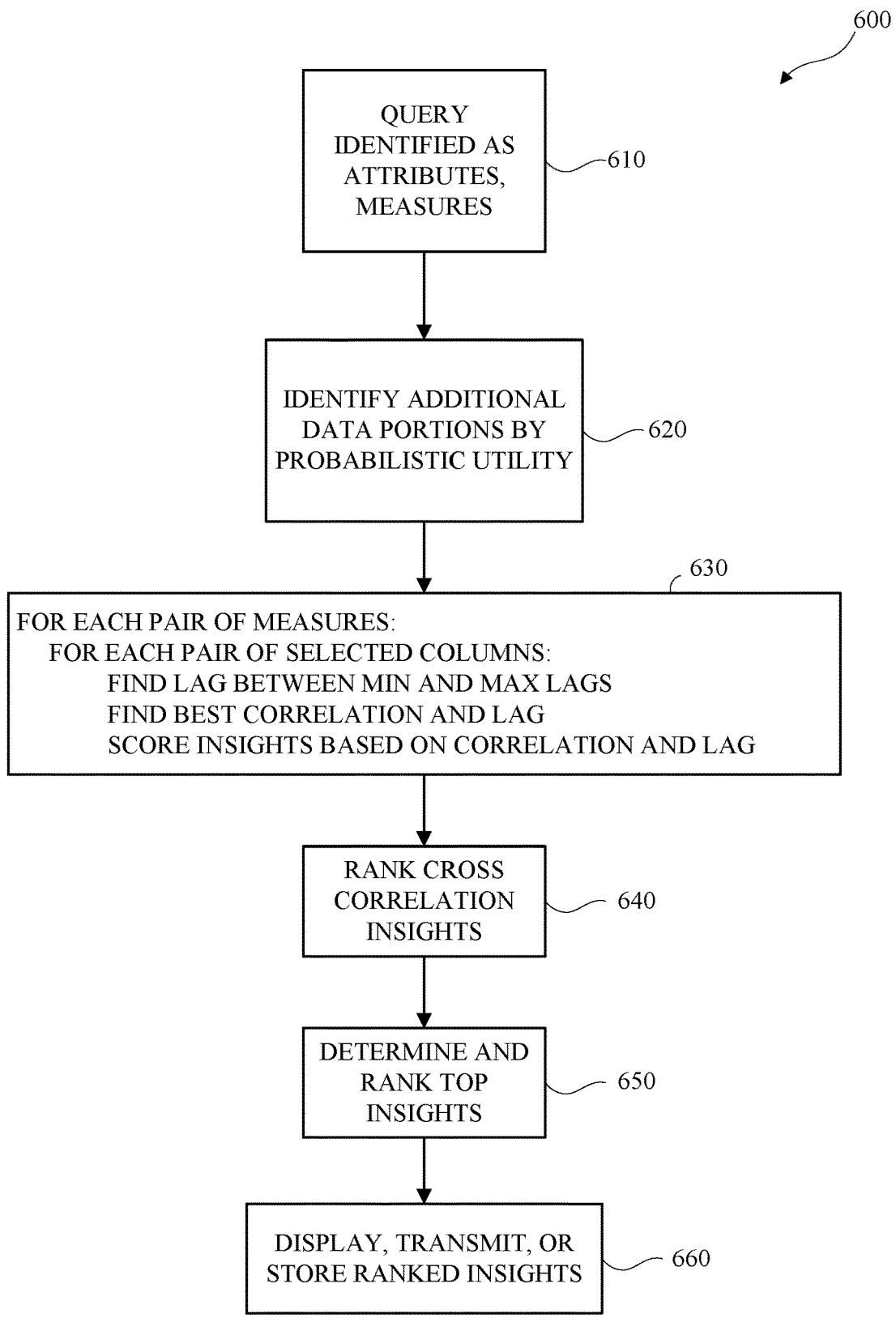
FIG. 6 is a flow diagram of an example of a method for cross correlation in accordance with this disclosure.

FIG. 6 is a flow diagram of an example of a method for cross correlation 600 that may be implemented by a retrieval system, such as, for example, the automatic database analysis system 200 shown in FIG. 2. Referring to FIG. 6, cross correlation 600 includes receiving a query and identifying the query as attributes and measures 610.

Cross correlation 600 may include identifying additional data portions by probabilistic utility 620. For example, identifying additional data portions by probabilistic utility may include automatically identifying additional attributes of utility, measures of utility, and columns of utility, for example, date columns.

In an example, cross correlation 600 may include determining a correlation between measures 630. In some implementations, cross correlation 600 may include determining a correlation between measures when the measures are shifted, for example, with respect to date. In an example of a sales cycle, the sales may be booked on a certain date referred to as a sales date, while an opportunity may be created at an earlier date referred to as an opportunity creation date. In this example, the two measures (i.e., sales amount and opportunity amount) are likely to be correlated since more opportunity amount would generally lead to more sales and vice versa. However, in this example, there may likely be a lag between the entries corresponding to the sales cycle. Cross correlation 600 may include automatically identifying whether measures are correlated. In some implementations, the method 700 may also include identifying a lag with the highest correlation.

Determining a correlation between measures 630 may include analyzing pairs of measures. Analyzing pairs of measures may include, for each pair of measures, identifying a correlation for each pair of selected columns. In some implementations, determining a correlation between measures 630 may include identifying a lag between a minimum lag and a maximum lag for each pair of selected columns, where the lag may represent a period of time between a first event and a second event. Determining a correlation between measures 630 may include scoring one or more insights based on the identified correlation, identified lag, or both for each pair of selected columns. Each insight may be associated with a respective correlation and lag score. For example, identification of may permit correlations between columns that have a leading or trailing correlation in time. For example, a particular value in one column may be correlated to a later value in another column (e.g., after a particular time period has elapsed). The scored insights may be referred to as cross correlation insights.

Cross correlation 600 may include ranking the cross correlation insights 640. Each insight may be determined and ranked based on its correlation and lag 650. The top ranking insights may be displayed, transmitted, or stored 660. For example, the top ranking insights may be displayed on a user device, transmitted using either a push notification or pull mechanism, stored in a memory, or a combination thereof.

Figure 7:
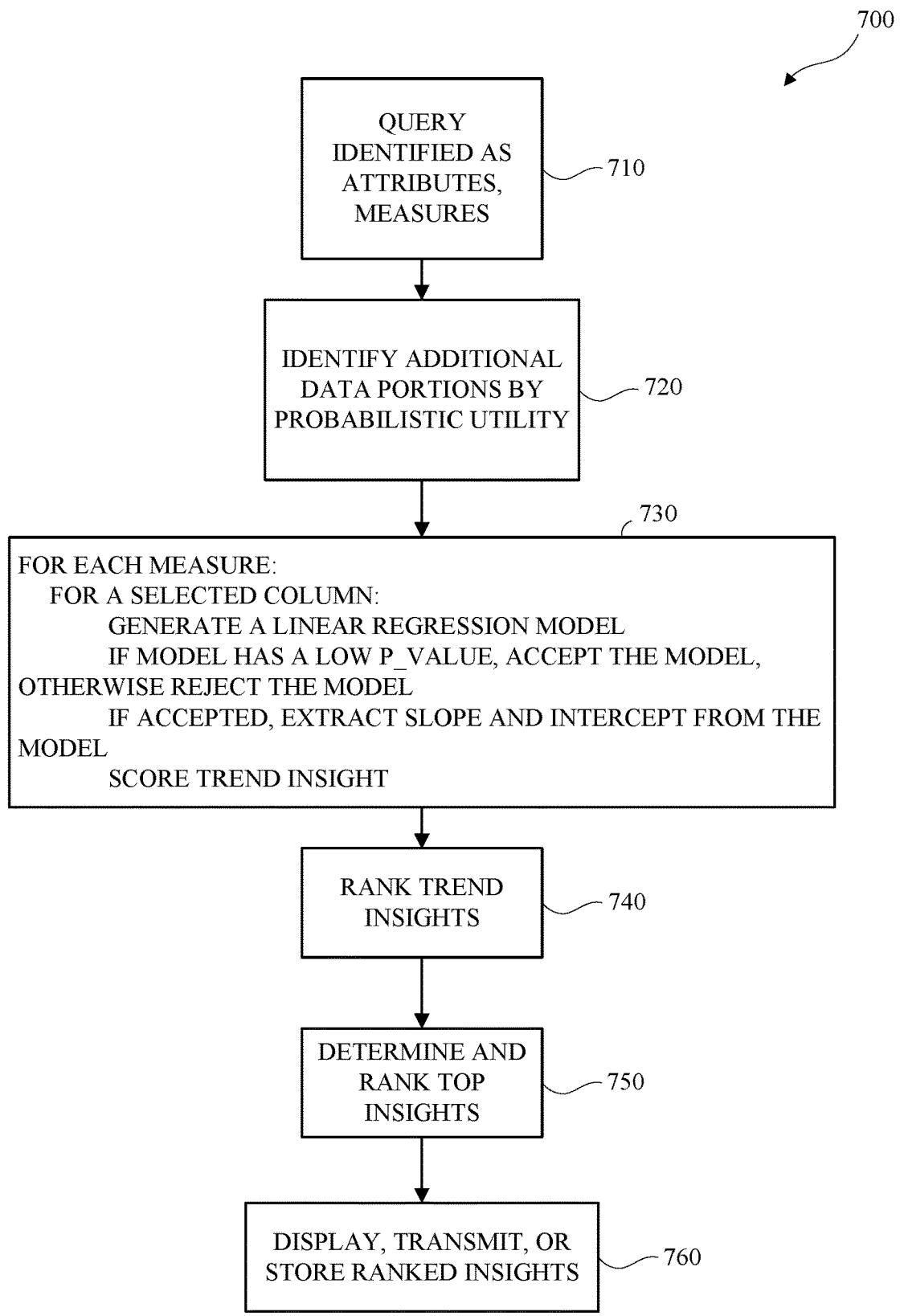
FIG. 7 is a flow diagram of an example of a method for trend analysis in accordance with this disclosure.

FIG. 7 is a flow diagram of an example of a method for trend analysis 700 that may be implemented by a retrieval system, such as, for example, the automatic database analysis system 200 shown in FIG. 2. Referring to FIG. 7, trend analysis 700 includes receiving a query and identifying the query as attributes and measures 710. Identifying the query as attributes an measures 710 may include automatically identifying trends of utility in measures along columns of utility, for example date columns. A linear regression model may be used for a specific measure along selected columns.

Trend analysis 700 includes identifying additional data portions by probabilistic utility 720. Identifying additional data portions by probabilistic utility 720 may include identifying additional attributes of utility, measures of utility, and columns of utility, for example, date columns.

Trend analysis 700 may include analyzing a selected column for each measure 730 to identify a trend insight. Analyzing a selected column for each measure 730 may include generating a linear regression model for a selected column based on a probabilistic utility. If the linear regression model has a low probability value (p-value), the model may be accepted and a slope and intercept from the linear regression model may be extracted to identify a trend insight. If the linear regression model has a high p-value, the linear regression model may be rejected. Analyzing a selected column for each measure 730 may include scoring a trend insight. A trend insight may be scored based on the extracted slope and intercept of the linear regression model. For example, a trend insight score may be determined such that the steeper the trendline, the higher the assigned score. Each insight may be associated with a respective trend insight score.

Trend analysis 700 may include ranking the identified trend insights 740. Each insight may be determined and ranked based on its respective trend insight score 750. The top ranking insights may be displayed, transmitted, or stored 760. For example, the top ranking insights may be displayed on a user device, transmitted using either a push notification or pull mechanism, stored in a memory, or a combination thereof.

Figure 8:
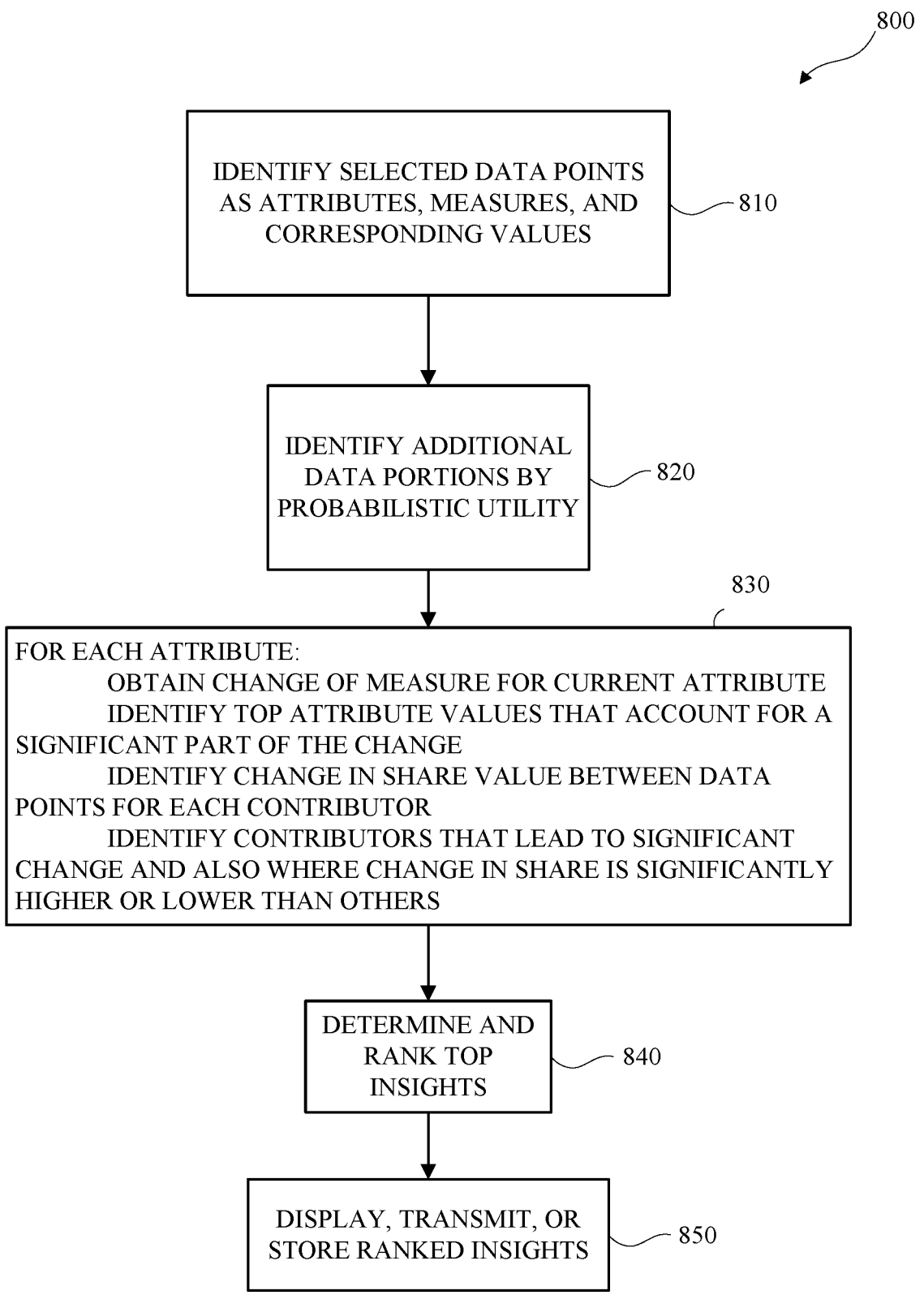
FIG. 8 is a flow diagram of an example of a method for comparative analysis in accordance with this disclosure.

FIG. 8 is a flow diagram of an example of a method for comparative analysis 800 that may be implemented by a retrieval system, such as, for example, the automatic database analysis system 200 shown in FIG. 2. Comparative analysis 800 may be used to determine the difference between data points and generating one or more insights that explain the difference between the underlying data points.

Referring to FIG. 8, comparative analysis 800 includes identifying one or more selected data points as attributes, measures, and corresponding values 810. Identifying one or more selected data points as attributes, measures, and corresponding values 810 may be based on probabilistic utility.

Comparative analysis 800 includes identifying additional data portions by probabilistic utility 820. Identifying additional portions by probabilistic utility 820 may include identifying additional attributes of utility, measures of utility, and columns of utility 820, for example, date columns.

Comparative analysis 800 may include analyzing attributes 830. For example, analyzing attributes 830 may include obtaining a change of measure for a current attribute. The current attribute may be a search query result. Analyzing attributes 830 may include identifying one or more top attribute values that account for a significant portion of the change. Analyzing attributes may include identifying a change in a share value between data points for each contributing data point. For example, one data point may have more influence on a result than another data point. The difference in influence on a result may be referred to as a change in share value. Analyzing an attribute 830 may include identifying one or more contributing data points that lead to a significant change and also where a change in share value is significantly higher or lower than other contributing data points. The contributing data points may be identified using a z-score method. Analyzing an attribute 830 may include scoring an insight based on a statistical significance of contributing data points that lead to a change, a statistical significance of a change in share value, or both.

Comparative analysis may include determining and ranking each insight based on contributing data points that lead to a change, a statistical significance of a change in share value, or both 840. The top ranking insights may be displayed, transmitted, or stored 850. For example, the top ranking insights may be displayed on a user device, transmitted using either a push notification or pull mechanism, stored in a memory, or a combination thereof.

Implementations of methods and system for automatically analyzing data in a database are disclosed. In an example, a method may include receiving a current context of the database. A current context may be the results of a query, an entire table, a worksheet, or a subset of the foregoing. The subset may include one or more data values or columns selected by a user.

The method may include identifying one or more columns of utility based on a probabilistic utility of the current context. Identifying the one or more columns of utility may include incorporating a user preference. The user preference may be associated with a user, a group of users, all users of the retrieval system, or any combination thereof. Identifying the one or more columns of utility may include incorporating system usage data. The system usage data may include a number of times a search term has been used. Identifying the one or more columns of utility may include incorporating user feedback.

The method may include generating one or more exploration queries. The one or more exploration queries may each be based on the one or more columns of utility. The method may include analyzing the one or more exploration queries to generate an exploration result set.

The method may include generating one or more insights. The one or more insights may be based on the current context, the exploration result set, or both. The method may include ranking the one or more insights. The method may include ranking the one or more insights by statistical significance. In some examples, the one or more insights may be personalized for each user based on a search history of the user, a user profile, a group profile, a data characteristic, or any combination thereof. The method may include displaying, transmitting, or storing the one or more insights based on the ranking.

The method may include identifying an algorithm of utility based on the current context and applying the algorithm of utility on a result set of the one or more exploration queries. In some examples, the algorithm of utility may be an outlier detection algorithm, a cross correlation algorithm, a trend analysis algorithm, a comparative analysis algorithm, or any suitable algorithm.

In some examples, the method may include updating the algorithm of utility based on the one or more generated insights. Updating the algorithm may be based on user feedback. In some examples, the insight may include a visualization. In some examples, the insight may include a natural language narrative that explains what is meaningful in the data.

In an example, a system for generating an insight may include an insight unit. The insight unit may be configured to receive a result from a structured query instruction. The result may be associated with a current context.

The insight unit may be configured to identify one or more columns of utility. The one or more columns of utility may be based on a probabilistic utility of the current context. The insight unit may be further configured to incorporate a user preference to identify the column of utility. The insight unit may be further configured to incorporate system usage data to identify the column of utility. The insight unit may be configured to generate an updated context based on the one or more columns of utility.

The insight unit may be configured to generate one or more exploration queries based on the one or more columns of utility. The insight unit may be configured to analyze the one or more exploration queries to generate an exploration result set.

The insight unit may be configured to generate one or more insights. The one or more insights may be based on the current context, the exploration result set, or both. The insight unit may be configured to rank the one or more insights. The system may include a display for displaying the one or more insights. In some examples, the displayed insight may include a visualization. In some examples, the displayed insight may include a natural language narrative that explains what is meaningful in the data.

The insight unit may be further configured to identify an algorithm of utility based on the current context and apply the algorithm of utility on a result set of the one or more exploration queries.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for analyzing data in a database, the method comprising:
performing, by a processor, automatic database insight analysis, wherein performing automatic database insight analysis includes:
identifying a current context for accessing data from a low-latency database, wherein the current context is computer-accessible data that includes a requested result set satisfying a requested search criterion;
generating an exploration query based on the current context, wherein generating the exploration query includes identifying a column from the low-latency database as a column of utility in response to a determination that a probabilistic utility for the column satisfies a defined utility criterion, wherein the probabilistic utility for the column is based on the current context;
generating an exploration result set based on the exploration query;
generating a plurality of insights based on the exploration result set;
ranking the plurality of insights; and
outputting an insight from the plurality of insights based on the ranking.

2. The method of claim 1, wherein identifying the column of utility includes:
using a user preference to identify the column of utility.

3. The method of claim 2, wherein the user preference is associated with a user or a group of users.

4. The method of claim 1, wherein identifying the column of utility includes:
using system usage data to identify the column of utility.

5. The method of claim 4, wherein the system usage data includes a count of a number of times a search term has been used.

6. The method of claim 1, wherein identifying the column of utility includes:
using user feedback to identify the column of utility.

7. The method of claim 1, wherein ranking the plurality of insights includes ranking the plurality of insights by statistical significance.

8. The method of claim 1, wherein generating the exploration query includes:
identifying an algorithm of utility using the current context; and
using the algorithm of utility to generate the exploration query.

9. The method of claim 8, wherein the algorithm of utility is an outlier detection algorithm, a cross correlation algorithm, a trend analysis algorithm, or a comparative analysis algorithm.

10. The method of claim 8, further comprising:
updating the algorithm of utility based on the insight.

11. The method of claim 8, further comprising:
updating the algorithm of utility based on user feedback.

12. The method of claim 1, wherein outputting the insight includes outputting a visualization representing the insight.

13. The method of claim 1, wherein outputting the insight includes outputting a natural language narrative that explains the insight.

14. The method of claim 1, wherein the current context is a computer-accessible data structure, distinct from the low-latency database.

15. A system for generating an insight, the system comprising:
an insight unit including a processor configured to:
identify a current context for accessing data from a low-latency database, wherein the current context is computer-accessible data that includes a requested result set satisfying a requested search criterion;
generate an exploration query based on the current context, wherein generating the exploration query includes identifying a column from the low-latency database as a column of utility in response to a determination that a probabilistic utility for the column satisfies a defined utility criterion, wherein the probabilistic utility for the column is based on the current context;
generate an exploration result set based on the exploration query;
generate a plurality of insights based on the exploration result set; and
rank the plurality of insights; and
output an insight from the plurality of insights based on the ranking.

16. The system of claim 15, wherein the insight unit is configured to use a user preference to identify the column of utility.

17. The system of claim 15, wherein the insight unit is configured to use system usage data to identify the column of utility.

18. The system of claim 15, wherein the insight unit is configured to:
identify an algorithm of utility based on the current context; and use the algorithm of utility to generate the exploration query.

19. The system of claim 15, wherein the insight unit is configured to output the insight, such that outputting the insight includes outputting a visualization representing the insight.

20. The system of claim 15, wherein the insight unit is configured to output the insight such that outputting the insight includes outputting a natural language narrative that explains the insight.

* * * * *